United States Patent Office 2,766,101
Patented Oct. 9, 1956

2,766,101

PREPARATION OF BASIC CHROMIUM SULPHATE FROM IRON-CHROMIUM ALLOYS

Michael C. Carosella and John D. Mettler, Niagara Falls, N. Y., assignors to Union Carbide and Carbon Corporation, a corporation of New York No Drawing. Application June 7, 1951, Serial No. 230,411

5 Claims. (Cl. 23—117)

The present invention relates to a method for the preparation of chromium chemicals substantially free of iron and other impurities from iron-chromium alloys.

Heretofore, one practice employed was to treat an iron-chromium alloy with sulphuric acid and then precipitate crystals of the iron salt and subsequently utilize the chromium in solution for producing chromium chemicals. This crystallization method was time-consuming and resulted in a relatively poor separation of iron from chromium.

Another method employed was to treat an iron-chromium alloy with sulphuric acid, and then selectively precipitate the chromium salt by adding a base to the leach liquor. The previously known precipitation methods yielded a gelatinous precipitate which made filtering and washing operations (and hence iron-chromium separation) difficult.

It is an object of the present invention to employ a precipitation method to produce an effective separation of chromium from iron-chromium alloys containing usual impurities such as carbon, silicon, cobalt, nickel and copper.

Another object is to obtain a granular basic chromium sulfate precipitate, substantially free from iron and other impurities, which can be readily converted to other chromium chemicals.

Other advantages and aims of the invention will be apparent from the following description.

In accordance with the present invention an iron-chromium alloy is digested with a dilute sulfuric acid, at a temperature of between 60° and 105° C. The resulting pulp is filtered to remove the residue which consists largely of silica. The filtrate is added, under substantially non-oxidizing atmospheric conditions, to a hot aqueous solution of an alkali or an alkaline earth metal base, for example sodium carbonate, to a final pH below 3.8, to yield a granular basic chromium sulfate precipitate which is easily filtered and washed free of soluble salts. The temperature of said alkali or alkaline earth metal base should be above 60° C. during this step in order to insure the obtaining of a granular precipitate, since at less than 60° C. the precipitate becomes gelatinous.

The basic chromium sulfate may be heated to approximately 1000° C. to produce a high grade chromic oxide or it may be readily dissolved with acid to yield chromium solutions for producing chromium chemicals of high purity.

As the filtrate is added to the alkali or alkaline earth metal base an initial precipitation of iron and chromium occurs at a pH of about 9.0. Then as additional filtrate is added and the pH reaches about 6.0 the initial iron precipitate goes into solution.

With further addition of filtrate the complete resolution of the initial iron precipitate is brought about leaving exclusively a precipitate of granular basic chromium sulfate.

We have discovered that the percentage of iron in the basic chromium sulfate precipitate can be controlled by regulation of the final pH in the precipitation step. As the final pH in this step is reduced the percentage of iron impurity in the precipitate is correspondingly reduced. This control, coupled with carrying out the precipitation operation in the substantially non-oxidizing atmosphere, results in a marked decrease in the percentage of iron in the basic chromium sulfate precipitate. However, it must be pointed out that as the final pH is reduced to obtain a decrease in iron content in the precipitate, there is a reduction in the percentage of the total chromium that is included in the precipitate. Therefore, efficiency demands that the final pH must not be reduced to too low a value.

We have found under substantially non-oxidizing atmospheric conditions that, above a final pH of about 3.8, the percentage of iron in the precipitate increases more rapidly for a given increase in pH. Thus, with the non-oxidizing atmospheric condition of operation and the final pH control by operating below the designated pH range, the iron impurities can be effectively reduced to a minimum, thereby resulting in a precipitate that can be easily filtered and washed.

The pH is also important in controlling the ratio between the sulfate and hydroxide proportion of the product in the basic chromium sulfate precipitate. The more acidic the solution becomes, the greater becomes the sulfate proportion in the precipitate.

An example of an operation under the process of this invention is as follows:

400 ml. of leach liquor containing 79.70 grams of chromium and 27.0 grams of iron per liter were obtained by digesting high carbon ferrochromium with dilute sulfuric acid and then filtering to remove the residue. This leach liquor was added under non-oxidizing atmospheric conditions to one liter of a 10% sodium carbonate solution which was maintained at 95° to 100° C., until a final pH of 2.8 was obtained. The precipitation time for the basic chromium sulfate was about two hours. The filtering rate was about 2 liters every five minutes on a 23 centimeter Büchner filter funnel operated at 20 inches vacuum. An analysis of the precipitate revealed a chromium-to-iron ratio of about 208 to 1 with only about 1% of the iron appearing as an impurity in the precipitate.

Other operations under the method of the present invention, which show the effect of final pH control and non-oxidizing atmosphere on the quality of the precipitate, are tabulated below.

In the table "Feed" denotes the constituents that are added in the precipitation step and includes the base (sodium carbonate) and the filtered leach liquor. The leach liquor contained 79.70 grams of chromium and 27.0 grams of iron per liter and was obtained by digesting high carbon ferrochromium with dilute sulfuric acid and then filtering to remove the residue. The "Precipitating data" gives the time in hours, the temperature of the bath in degrees centigrade, the final pH, and the filtering rate in liters per five minutes on a 23 centimeter Büchner filter funnel operated at 20 inches vacuum. The "Precipitate analysis" gives the percentages of chromium and iron in the precipitate, the chromium-to-iron ratio, and the total chromium recovered in the precipitate expressed in percent.

Table

| Test Number | 1 | 2 | 3 | 4 | 5 | 6 | 7 |
|---|---|---|---|---|---|---|---|
| Feed: | | | | | | | |
| Sodium Carbonate, Gms. | 110 | 120 | 110 | 130 | 115 | 105 | 95 |
| Leach liquor, Ml. | 400 | 400 | 400 | 400 | 400 | 400 | 400 |
| Precipitating Data: | | | | | | | |
| Time, hrs. | 1 | 2 | 2 | 2 | 2 | 2 | 6 |
| Temperature, °C. | 95–100 | 95–100 | 95–100 | 95–100 | 95–100 | 95–100 | 95–100 |
| Final pH | 3.2 | 3.8 | 3.2 | 5.1 | 3.6 | 3.1 | 2.7 |
| Filtering Rate, Liters/5 min. | 2.5 | 3 | 2.5 | 3 | 3 | 2.5 | 1.5 |
| Precipitate Analysis: | | | | | | | |
| Percent Chromium | 36.06 | 36.85 | 36.71 | 37.40 | 37.82 | 37.67 | 34.68 |
| Percent Iron | 1.65 | 3.35 | 0.81 | 6.62 | 2.12 | 0.36 | 0.13 |
| Chromium/iron | 22/1 | 11/1 | 45/1 | 5.6/1 | 18/1 | 105/1 | 267/1 |
| Percent Chromium recovered | 96.1 | 94.8 | 95.0 | 96.2 | 96.1 | 94.5 | 80.5 |

In run 1 no attempt was made to exclude air during the precipitation. When the results of run 1 are contrasted with those of run 3, wherein air was excluded but all other conditions were maintained, the advantage of oxidizing atmosphere exclusion becomes apparent.

The importance of final pH control on the iron-chromium separation may be appreciated after a study of above-tabulated results of runs conducted according to the method of the present invention. These figures show the tremendous difference in the iron-chromium ratio of the precipitate that may be obtained for only a slight change in final pH and the desirability of controlling the final pH as hereinbefore described.

What is claimed is:

1. In a process for the preparation of basic chromium precipitate from iron-chromium alloys containing the usual impurities, the steps of digesting said iron-chromium alloy with dilute sulphuric acid at a temperature of between approximately 60° C. and 105° C., separating the leach liquor from the residue, adding said leach liquor under substantially non-oxidizing atmospheric conditions to an aqueous solution containing a base selected from the group consisting of the alkalies and alkaline earth metal bases at a temperature above 60° C. until a final pH below approximately 3.8 is obtained, to form a granular basic chromium sulphate precipitate, and separating said precipitate from the solution.

2. The process of claim 1 wherein high carbon ferrochromium is used as the iron-chromium alloy.

3. The process of claim 1 wherein sodium carbonate is used as the base.

4. In the process for the preparation of basic chromium sulfate precipitate from acidic chromium sulfate solutions containing other cations as impurities, the steps of adding said solution under substantially non-oxidizing conditions to an aqueous solution containing a base selected from the group consisting of the alkalies and alkaline earth metal bases at a temperature above 60° C. until a final pH below approximately 3.8 is obtained, to form a granular basic chromium sulfate precipitate, and separating said precipitate from the solution containing said impurities.

5. The process of claim 7 wherein sodium carbonate is used as the base.

References Cited in the file of this patent

UNITED STATES PATENTS

| | | |
|---|---|---|
| 1,343,725 | Hultman | June 15, 1920 |
| 1,403,237 | Custis | Jan. 10, 1922 |
| 2,034,256 | Vetter | Mar. 17, 1936 |
| 2,110,187 | Williams | Mar. 8, 1938 |
| 2,390,272 | Reismeyer | Dec. 4, 1945 |
| 2,583,591 | Perrin | Jan. 29, 1952 |
| 2,600,171 | Sagen | June 10, 1952 |

OTHER REFERENCES

J. W. Mellor: "Inorganic and Theoretical Chemistry," vol. 11, 1928, page 455, Longmans, Green and Company, N. Y.

Mellor: "Treatise on Inorganic and Theoretical Chemistry," vol. XI, pages 435, 438, 442, 444, 446, 189, Longmans, Green & Co., N. Y., 1931.

Mellor: "Comprehensive Treatise on Inorganic and Theoretical Chemistry," Longmans, Green and Co., N. Y., 1931, vol. 11, pages 188, 366, 443.